2,797,227
Patented June 25, 1957

2,797,227

BASIC ESTERS OF 2-NORCAMPHANECARBOXYLIC ACID AND OF BICYCLO [2.2.2]-OCTANE-2-CARBOXYLIC ACIDS, THEIR SALTS, AND NUCLEARLY ALKYLATED SUBSTITUTION PRODUCTS THEREOF

William W. Jenkins, Morton Grove, Ill., assignor, by mesne assignments, to G. D. Searle & Co., Skokie, Ill., a corporation of Delaware No Drawing. Application April 20, 1953,
Serial No. 349,970

11 Claims. (Cl. 260—326.3)

The present application is a continuation-in-part of my copending application, Serial Number 261,396, filed December 12, 1951. It is concerned with a new group of basic esters of certain polycarbocyclic acids and, particularly, with the basic esters of 2-norcamphanecarboxylic acid and of bicyclo[2.2.2]octane-2-carboxylic acid, their salts, and the nuclearly alkylated substitution products thereof. While this alkylation may be effected at any of the nuclear carbon atoms, the 2- and 3-positions are preferred for the purposes of the present invention. The compounds with which this invention is particularly concerned are those of the general structural formula shown

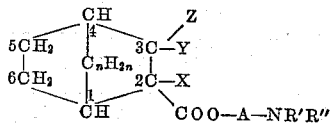

and the salts thereof, wherein $n$ is one or two, X, Y, and Z are either hydrogen or lower alkyl radicals, A is a bivalent aliphatic hydrocarbon radical containing at least 2 carbon atoms and NR'R" is either a lower dialkylamino radical or a nitrogen-containing heterocyclic radical attached through a nitrogen in the heterocycle to the radical A.

In the foregoing structural formula the radicals X, Y, and Z can be hydrogen or such lower alkyl radicals as methyl, ethyl, and straight-chained and branch-chained propyl, butyl, amyl, and hexyl.

The radical A is derived from such straight- or branch-chained aliphatic hydrocarbon radicals as ethylene, propylene, butylene, amylene, hexylene or polymethylene radicals such as trimethylene, tetramethylene, pentamethylene and hexamethylene.

The radicals R' and R" can be lower alkyl groups. The radical NR'R" can also be a nitrogen-containing lower heterocyclic radical such as a piperazino, N'-alkylpiperazino, thiamorpholino, quinolino, and isoquinolino radical, but of particular interest are the heterocyclic radicals of the type

wherein B is either an ethyleneoxyethylene radical, as in the case of the morpholino radical, or an alkylene chain containing 4 to 7 carbon atoms as in the case of pyrrolidino, piperidino, 2,5-dimethylpyrrolidino, and 2,6-lupetidino radicals.

The organic bases described herein form salts which are non-toxic in therapeutic dosage with a variety of inorganic and strong organic acids, including sulfuric, phosphoric, hydrochloric, hydrobromic, hydriodic, sulfamic, citric, lactic, maleic, malic, succinic, tartaric, cinnamic, acetic, benzoic, gluconic, ascorbic, and related aids. They also form quaternary ammonium salts with a variety of organic esters of sulfuric, hydrohalic and aromatic sulfonic acids. Among such esters are methyl chloride, bromide and iodide; ethyl chloride, propyl chloride, butyl bromide, isobutyl chloride, benzyl chloride, phenethyl chloride, naphthylmethyl chloride, dimethyl sulfate, methyl benzenesulfonate, ethyl toluenesulfonate, ethylene chlorohydrin, propylene chlorohydrin, allyl chloride, methallyl bromide and crotyl bromide.

The acids which constitute the starting material for the invention are prepared by a Diels-Alder addition of a compound of the type

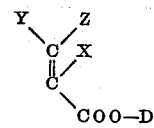

wherein D is a hydrogen or lower alkyl group, and X, Y, and Z are defined as hereinabove to cyclopentadiene and cyclohexadiene, as shown by Alder et al., Annalen der Chemie, vol. 514, pages 197 et seq., 1934; Fiesselmann, Berichte deut. chem. Ges., vol. 75, pages 881 et seq., 1942 and Seka et al., ibid, pages 1379 et seq. The resulting bicyclo[2.2.1]5-heptene-2-carboxylic acid and bicyclo [2.2.2]5-octene-2-carboxylic acid derivatives are hydrogenated under pressure in the presence of a catalyst such as Raney nickel or palladium to form the derivatives of 2-norcamphanecarboxylic acid and bicyclo[2.2.2]octane-2-carboxylic acid. Esterification is carried out in the conventional manner.

The esters which constitute the present invention are valuable as intermediates in organic synthesis. They are of value as medicinal agents, especially because of their action on the cardiovascular system, particularly as blood pressure lowering agents and as diuretics. The quaternary salts are of special interest because of their effects in inhibiting transmission of autonomic nerve impulses through the ganglia.

My invention is disclosed in further detail by the following examples which are set forth for the purpose of illustrating this invention, but are in no way to be construed as limiting it in spirit or in scope. It will be apparent to those skilled in the art of organic synthesis that many conventional modifications in methods, conditions and materials can be adopted without departing therefrom.

In each of these examples, quantities of materials are indicated as parts by weight, temperatures are given uncorrected in degrees centigrade and pressures in millimeters of mercury.

EXAMPLE 1

β-Diethylaminoethyl ester of 2-norcamphanecarboxylic acid 2-norcamphanecarboxylic acid is prepared by catalytic reduction of bicyclo[2.2.1]5-heptene-2-carboxylic acid. Thus 276 parts of this unsaturated acid are hydrogenated in the presence of 2 parts of a 5% palladium carbon catalyst in 1200 parts of ethanol in a Parr low pressure bomb at 25 to 40 lbs. pressure for 5 hours. The catalyst is removed by filtration and, after addition of a solution of 100 parts of sodium hydroxide in 250 parts of water, the solvent is stripped off. The residue is dissolved in water, the solution clarified with charcoal and acidified. The acid is extracted with ether and the ether extract dried over anhydrous sodium sulfate, filtered and evaporated.

Instead of the palladium catalyst, Raney nickel can also be usefully employed under the same conditions.

300 parts of the 2-norcamphanecarboxylic acid thus obtained are heated with a solution of 300 parts of β- chloroethyldiethylamine in 800 parts of 2-propanol at reflux temperature for 5 hours. The solvent is stripped under vacuum and the residue extracted with water. The aqueous solution is washed with ether, rendered alkaline by addition of dilute sodium hydroxide and extracted with ether. The ether extract is dried over anhydrous calcium sulfate, filtered and evaporated. The β-diethylaminoethyl ester of 2-norcamphanecarboxylic acid is then distilled at about 103–105° C. and 0.5 mm. pressure.

A solution of this base in anhydrous ether is treated with one equivalent of a 25% solution of hydrogen chloride in anhydrous 2-propanol. There is an immediate formation of a white precipitate of the hydrochloride which, recrystallized from anhydrous ethyl acetate, melts at about 153–155° C.

EXAMPLE 2

β-(2-norcamphanecarboxy)ethyldiethylmethylammonium bromide

A mixture of 130 parts of the β-diethylaminoethyl ester of 2-norcamphanecarboxylic acid and 90 parts of methylbromide in 240 parts of butanone is kept at room temperature in a sealed pressure reactor. The β-(2-norcamphanecarboxy)ethyldiethylmethylammonium bromide crystallizes and is collected on a filter. It is thus obtained in the form of hygroscopic crystals which melt at about 120–123° C. The compound has the structural formula

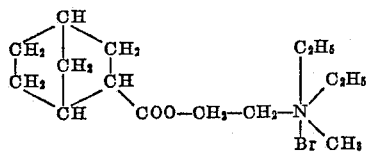

EXAMPLE 3

β-(2,5-dimethyl-1-pyrrolidino)ethyl ester of bicyclo [2.2.2]-octane-2-carboxylic acid A mixture of 500 parts of freshly distilled cyclohexadiene, 800 parts of methyl acrylate and a small amount of hydroquinone is placed into a bomb and heated at 160–170° C. for 12 hours. After cooling, the contents are removed with ether and the resulting solution is refluxed for 10 hours with a solution of 825 parts of potassium hydroxide in 830 parts of water and 2400 parts of methanol. The solvent is stripped under vacuum and the residue is dissolved in water, washed with ether, made acidic with dilute hydrochloric acid and extracted with ether. The extract is washed with water dried over anhydrous calcium chloride, filtered and evaporated to yield the bicyclo-[2.2.2.]-5-octene-2-carboxylic acid which is distilled at about 108–112° C. and 0.3–0.5 mm. pressure.

A solution of 320 parts of the distillate in 1600 parts of ethanol is hydrogenated in the presence of 40 parts of Raney nickel at 25–40 pounds pressure with agitation in a bomb in the course of 5 hours. The contents of the bomb are filtered and the filtrate is treated with 715 parts of a 40% aqueous sodium hydroxide solution. The solvent is removed under vacuum and the residue is dissolved in water, washed with ether, made acidic with dilute hydrochloric acid and extracted with ether. This extract is washed with saturated sodium chloride solution, dried over calcium chloride, filtered and evaporated to yield bicyclo[2.2.2]octane-2-carboxylic acid which is distilled at about 102–104° C. and 0.3–0.5 mm. pressure. It melts at about 83.5–84.5° C.

A mixture of 305 parts of this reduced acid, 1700 parts of benzene, 240 parts of thionyl chloride and 158 parts of pyridine is heated at reflux temperature for 90 minutes, cooled, and filtered with filter aid. The filtrate, which contains bicyclo [2.2.2]octane-2-carbonyl chloride, is diluted with 2700 parts of benzene and mixed with 274 parts of 1-(β-hydroxyethyl)-2,5-dimethyl-pyrrolidine. After standing for 48 hours the mixture is refluxed for 4 hours, cooled and extracted with dilute hydrochloric acid. The extract is washed with ether, made alkaline by addition of dilute potassium hydroxide and extracted with ether. The ether extract is dried over anhydrous calcium sulfate, filtered and evaporated to yield the β-(2,5-dimethyl-1-pyrrolidino)ethyl ester of bicyclo[2.2.2]octane-2-carboxylic acid, which is distilled at about 124–127° C. and 0.2 mm. pressure.

12 parts of this base are dissolved in 280 parts of absolute ether and treated with one equivalent of absolute ethanolic hydrogen chloride. An immediate white precipitate forms. This is collected on a filter and crystallized from 2-propanol and ethyl acetate, using charcoal decolorization. The hydrochloride of the β-(2,5-dimethyl-1-pyrrolidino)ethyl ester of bicyclo [2.2.2]octane-2-carboxylic acid melts at about 198–201° C. with decomposition. It has the structural formula

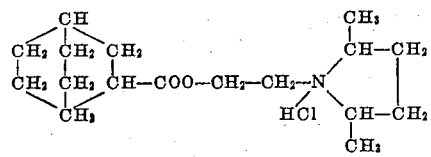

EXAMPLE 4

β-(2-bicyclo[2.2.2]octane-2-carboxy)ethyldiethylmethylammonium bromide

A solution of 17 parts of β-(2,5-dimethyl-1-pyrrolidino)ethyl ester of bicyclo [2.2.2]octane-2-carboxylic acid in 28 parts of butanone is treated with 10.4 parts of methyl bromide in a shielded reactor. In a short while the β-(2-bicyclo[2.2.2]octane - 2 - carboxy)ethyldiethylmethylammonium bromide precipitates.

EXAMPLE 5

δ-Pyrrolidinobutyl ester of bicyclo[2.2.2]octane-2-carboxylic acid

A mixture of 114 parts of bicyclo[2.2.2]octane-2-carbonyl chloride and 88 parts of N-(δ-hydroxy)butylpyrrolidine in 1500 parts of benzene is heated at reflux temperature for 5 hours and then treated with ice and hydrochloric acid. The aqueous layer is separated, washed with ether, rendered alkaline by addition of dilute sodium hydroxide and extracted with ether. This extract is dried over anhydrous calcium sulfate, filtered and evaporated to yield the δ-pyrrolidinobutyl ester of bicyclo[2.2.2]-octane-2-carboxylic acid which is distilled at about 120–130° C. and 0.2 mm. pressure. It has the structural formula

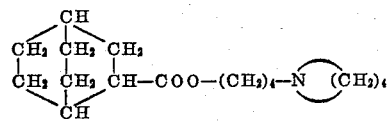

EXAMPLE 6

γ-Dipropylaminopropyl ester of bicyclo[2.2.2]octane-2-carboxylic acid

A solution of 228 parts of bicyclo[2.2.2]octane-2-carbonyl chloride in 3000 parts of benzene is mixed with 174 parts of γ-hydroxypropyldipropylamine. After subsidence of the initial exothermic reaction, the mixture is refluxed for 4 hours, cooled and extracted with dilute hydrochloric acid. This extract is washed with ether, made alkaline by addition of ammonium hydroxide and then extracted with ether. This ether solution is dried over anhydrous calcium sulfate, filtered and evaporated to yield the γ-dipropylaminopropyl ester of bicyclo-[2.2.2]octane-2-carboxylic acid as an oil which is distilled at about 130° C. and 0.2 mm. pressure. It has the structural formula

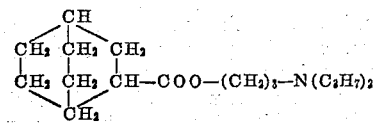

EXAMPLE 7

*β-Diethylaminoethyl ester of 2-methyl-2-norcamphanecarboxylic acid*

A mixture of 360 parts of 2-methyl-2-norcamphanecarboxylic acid and 324 parts of β-chloroethyldiethylamine in 1200 parts of anhydrous 2-propanol is heated at reflux temperature for 6.5 hours, after which the solvent is partially removed under vacuum and the residue is dissolved in water. The aqueous solution is washed with ether, rendered alkaline by addition of potassium hydroxide and extracted with ether. The ether extract is dried over anhydrous calcium sulfate, filtered and evaporated. The residue is distilled at about 116–120° C. and 1.7 mm. pressure.

A solution of the β-diethylaminoethyl ester of 2-methyl-2-norcamphanecarboxylic acid in anhydrous ether is treated with one equivalent of an alcoholic solution of hydrogen chloride. There is an immediate formation of a white precipitate. The hydrochloride thus obtained melts at about 151–153° C.

EXAMPLE 8

*β-(2-methyl-2-norcamphanecarboxy)ethyldiethylmethylammonium bromide*

A mixture of 130 parts of the β-diethylaminoethyl ester of 2-methyl-2-norcamphanecarboxylic acid and 90 parts of methyl bromide in 240 parts of butanone is stored in a sealed pressure reactor at room temperature. Within a short time a white precipitate separates. The contents of the flask are treated with anhydrous ether and the precipitate collected on a filter and recrystallized from ethyl acetate and anhydrous 2-propanol. The β-(2-methyl-2-norcamphanecarboxy)ethyldiethylmethylammonium bromide melts at about 167–169° C.

Treatment of a solution of 3 mols of this bromide in propanol with 1 mol of silver citrate and 2 mols of citric acid by stirring at room temperature, removal of the precipitated silver bromide by filtration and concentration of the filtrate yields the dihydrogen citrate. The cation has the structural formula.

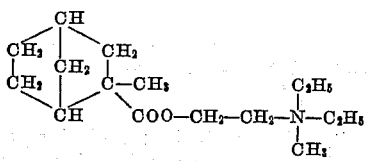

EXAMPLE 9

*β-Butylaminoethyl ester of 2-methyl-2-norcamphanecarboxylic acid*

A mixture of 72 parts of 2-methyl-2-norcamphanecarboxylic acid and 65 parts of β-chloroethylbutylamine in 250 parts of anhydrous 2-propanol is heated at reflux temperature for 6 hours, concentrated and dissolved in water. The aqueous solution is washed with ether, rendered alkaline by addition of sodium hydroxide and extracted with ether. This extract is dried over anhydrous potassium carbonate, filtered and evaporated to yield the β-butylaminoethyl ester of 2-methyl-2-norcamphanecarboxylic acid which is distilled at about 115–120° C. and 0.1 mm. pressure. It has the structural formula

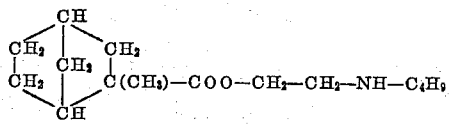

EXAMPLE 10

*γ-(N-morpholino)propyl ester of 2-ethyl-2-norcamphanecarboxylic acid*

A mixture of 100 parts of 2-ethyl-2-norcamphanecarboxylic acid and 103 parts of N-(γ-chloropropyl)morpholine in 500 parts of anhydrous propanol is stirred and heated at reflux temperature for 7 hours. The solvent is stripped off under vacuum and the residue taken up in water. The aqueous solution is washed with ether, rendered alkaline by addition of dilute sodium hydroxide and extracted with ether. The ether extract is dried over anhydrous potassium carbonate, stirred with decolorizing charcoal, filtered and evaporated. The γ-(N-morpholino)propyl ester of 2-ethyl-2-norcamphanecarboxylic acid consists of a light orange oil which has the structural formula

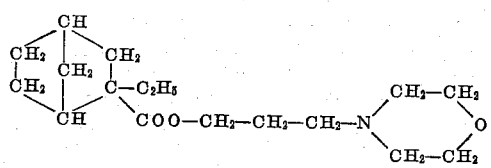

EXAMPLE 11

*β-diethylaminoethyl ester of 3-methyl-2-norcamphanecarboxylic acid*

A mixture of 195 parts of 3-methyl-2-norcamphanecarboxylic acid and 175 parts of β-chloroethyldiethylamine in 800 parts of anhydrous 2-propanol is heated at reflux temperature for 7 hours with mechanical stirring. The solvent is removed under vacuum and the residue extracted with water. The aqueous extract is washed with ether, rendered alkaline and extracted with ether. The ether extract is dried over anhydrous potassium carbonate, filtered and evaporated. The β-diethylaminoethyl ester of 3-methyl-2-norcamphanecarboxylic acid is distilled at about 78–84° C. and 0.07 mm. pressure. A solution of this base in absolute ether is treated with one equivalent of an alcoholic solution of hydrogen chloride. The immediately forming precipitate is recrystallized from absolute ethyl acetate to yield a hydrochloride melting at about 132–133° C.

EXAMPLE 12

*β-(3-methyl-2-norcamphanecarboxy)ethyldiethylmethylammonium bromide*

A mixture of 90 parts of the β-diethylaminoethyl ester of 3-methyl-2-norcamphanecarboxylic acid and 60 parts of methyl bromide in 240 parts of butanone is sealed in a pressure reactor and kept at room temperature. A precipitate forms. The contents of the reactor are treated with anhydrous ether and the β-(3-methyl-2-norcamphanecarboxy)ethyldiethylmethylammonium bromide collected on a filter. The salt is very hygroscopic and melts in the range of 72–82° C. It has the structural formula

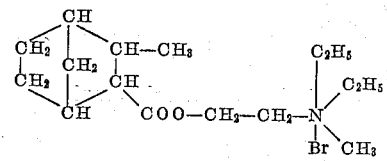

EXAMPLE 13

*γ-diisopropylaminopropyl ester of 3-ethyl-2-norcamphanecarboxylic acid*

A mixture of 336 parts of 3-ethyl-2-norcamphanecarboxylic acid and 356 parts of γ-chloropropyldiisopropylamine in 1500 parts of anhydrous propanol is turbinated at reflux temperature for 8 hours, concentrated in vacuum and extracted with water. The aqueous solution is washed with ether, rendered alkaline by addition of dilute sodium hydroxide and extracted with ether. The ether extract is dried over anhydrous potassium carbonate, stirred with decolorizing charcoal, filtered and evaporated to yield the γ-diisopropylaminopropyl ester of 3-ethyl-2-norcamphane carboxylic acid as a clear, yellow oil boiling at about 130–140° C. and 1.0 mm. pressure. It has the structural formula

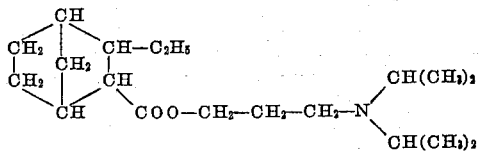

EXAMPLE 14

*β-(N-2,6-lupetidino)ethyl ester of 2,3-diethyl-2-norcamphanecarboxylic acid*

A mixture of 100 parts of 2,2-diethyl-2-norcamphanecarboxylic acid and 90 parts of N-(β-chloroethyl)-2,6-lupetidine in 500 parts of anhydrous 2-propanol is agitated at reflux temperature for 10 hours and then concentrated. The solid precipitate is extracted with water and the aqueous extract washed with ether and rendered alkaline by the addition of dilute potassium hydroxide. The base is extracted with ether and the ether extract is dried over anhydrous calcium sulfate, stirred with decolorizing charcoal, filtered and evaporated. The resulting β-(N-2,6-lupetidino)ethyl ester of 2,3-diethyl-2-norcamphanecarboxylic acid is obtained as a clear, amber oil which has the structural formula

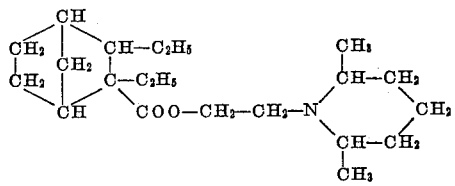

EXAMPLE 15

*δ-dimethylaminobutyl ester of 3,3-dimethyl-2-norcamphanecarboxylic acid*

A mixture of 100 parts of 3,3-dimethyl-2-norcamphanecarboxylic acid and 84 parts of δ-chlorobutyldimethylamine in 500 parts of anhydrous propanol is stirred and heated at reflux temperature for 8 hours, concentrated and extracted with water. The aqueous extract is washed with ether, rendered alkaline by addition of sodium hydroxide and extracted with ether. The resulting extract is dried over anhydrous calcium sulfate, stirred with decolorizing charcoal, filtered and evaporated to yield the δ-dimethylaminobutyl ester of 3,3-dimethyl-2-norcamphanecarboxylic acid as a clear, amber oil which boils at about 118–122° C. and 0.1 mm. pressure. It has the structural formula

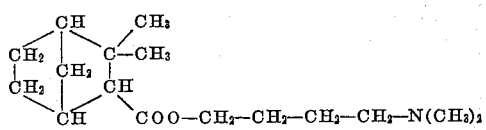

I claim:

1. A compound of the structural formula

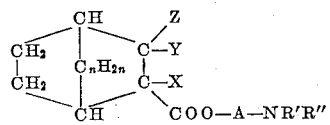

wherein $n$ is a positive integer smaller than 3, X, Y, and Z are members of the class consisting of hydrogen and lower alkyl radicals, A is a lower alkylene radical separating the oxygen and nitrogen atoms attached thereto by at least two carbon atoms, and NR'R'' is a member of the class consisting of lower alkylamino radicals, lower dialkylamino radicals, morpholino radicals and cyclic radicals containing more than 4 and less than 7 members in the ring wherein R' and R'' are combined to form a lower alkylene radical containing 4 to 7 carbon atoms.

2. A di(lower alkyl)aminoalkyl ester of 2-norcamphanecarboxylic acid wherein the nitrogen atom is removed from the carboxyl radical by a lower alkylene radical containing at least two carbon atoms.

3. A compound of the structural formula

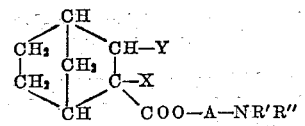

wherein one of the radicals X and Y is a lower alkyl radical and the other a hydrogen radical, A is a lower alkylene radical separating the oxygen and nitrogen atom attached thereto by at least two carbon atoms, and R' and R'' are lower alkyl radicals.

4. A compound of the structural formula

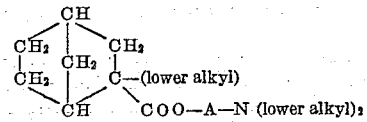

wherein A is a lower alkylene radical separating the oxygen and nitrogen atoms attached thereto by at least two carbon atoms.

5. A compound of the structural formula

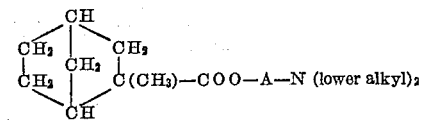

where A is a lower alkylene radical separating the oxygen and nitrogen atoms attached thereto by at least two carbon atoms.

6. A compound of the structural formula

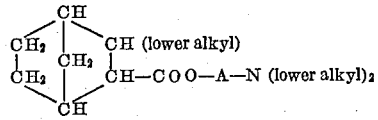

wherein A is a lower alkylene radical separating the oxygen and nitrogen atoms attached thereto by at least two carbon atoms.

7. A compound of the structural formula

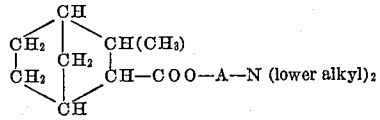

wherein A is a lower alkylene radical separating the oxygen and nitrogen atoms attached thereto by at least two carbon atoms.

8. A compound of the structural formula

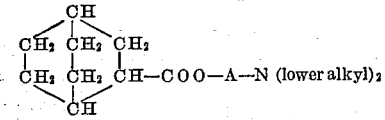

wherein A is a lower alkylene radical separating the oxygen and nitrogen atoms attached thereto by at least two carbon atoms.

9. A compound of the structural formula

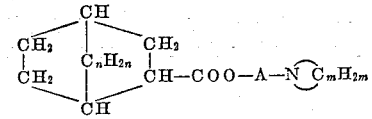

wherein $m$ is an integer greater than 3 and smaller than 8, $n$ is a positive integer smaller than 3 and A is a lower alkylene radical separating the oxygen and nitrogen atom attached thereto by at least two carbon atoms and wherein the radical

contains more than 4 and less than 7 members in the ring.

10. A compound of the structural formula

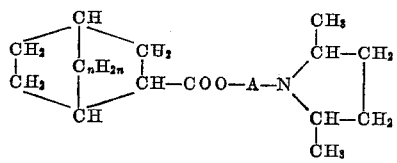

wherein $n$ is a positive integer smaller than 3 and A is a lower alkylene radical separating the oxygen and nitrogen atom attached thereto by at least two carbon atoms.

11. β-(2,5-dimethyl-1-pyrrolidino)ethyl ester of bicyclo[2.2.2]octane-2-carboxylic acid.

References Cited in the file of this patent

UNITED STATES PATENTS

| | | |
|---|---|---|
| 2,673,873 | Jenkins | Mar. 30, 1954 |
| 2,681,913 | Cusic | June 22, 1954 |
| 2,681,931 | Jenkins | June 22, 1954 |
| 2,688,021 | Jenkins | Aug. 31, 1954 |

OTHER REFERENCES

Moffett et al.: Jr. Am. Chem. Soc., vol. 69, pp. 1854–7 (1947).